Feb. 1, 1966 P. FORTESCUE ETAL 3,232,841
NUCLEAR REACTOR CONTROL ROD DRIVE MECHANISM
Filed May 6, 1963 5 Sheets-Sheet 1

Inventors
PETER FORTESCUE
FRANCIS R. BELL
ARTHUR M. HARRIS
By Anderson, Luedeka, Fitch,
Even & Tabin Attys Inventors
PETER FORTESCUE
FRANCIS R BELL
ARTHUR M HARRIS
By Anderson, Luedeka, Fitch,
Even & Tabin Attys

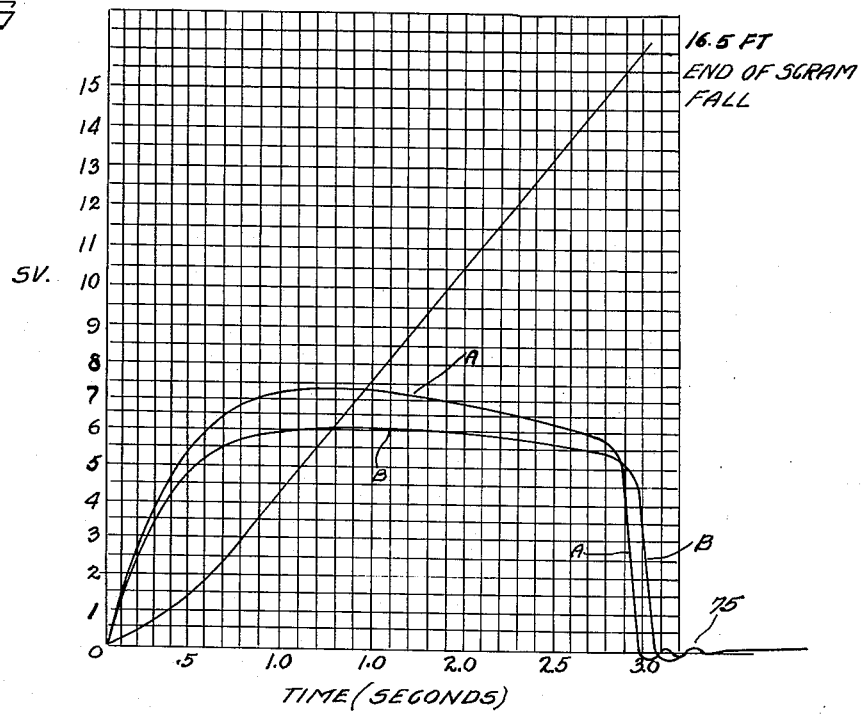
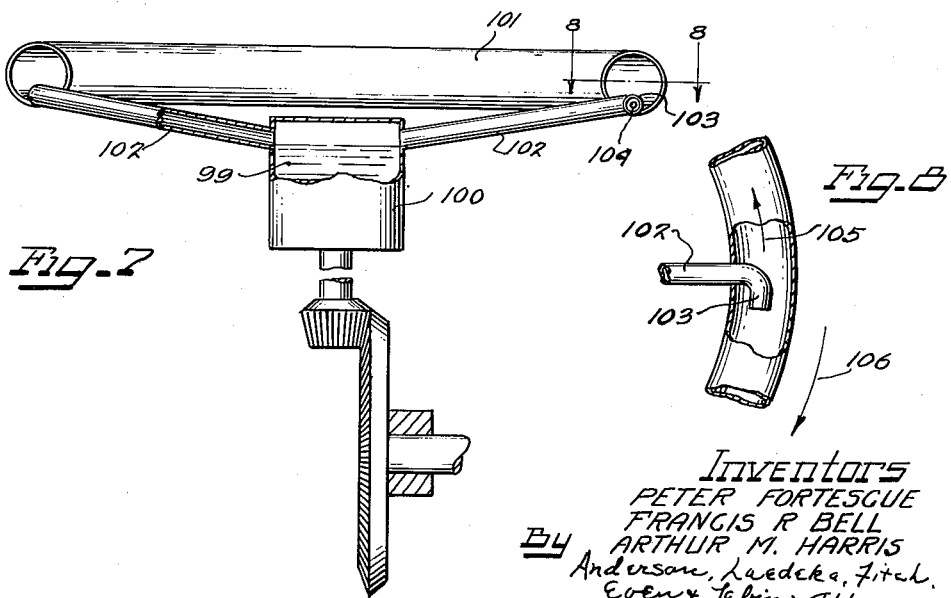

United States Patent Office 3,232,841
Patented Feb. 1, 1966

3,232,841
NUCLEAR REACTOR CONTROL ROD
DRIVE MECHANISM
Peter Fortescue, Rancho Santa Fe, and Francis R. Bell and Arthur M. Harris, San Diego, Calif., assignors to General Dynamics Corporation, New York, N.Y., a corporation of Delaware
Filed May 6, 1963, Ser. No. 278,131
8 Claims. (Cl. 176—36)

The present invention relates to a control rod drive for use in nuclear reactors and more particularly, to a safety arrangement or system where in the case of loss of normal control or any other emergency which might cause a catastrophe or damage to the reactor, the control rod or rods by which the speed of the nuclear reaction is controlled may be quickly inserted into the core of the reactor for their full length or to a sufficient depth so as to stop the reaction until the malfunctioning of the reactor may be investigated and corrected.

In the type of reactor for which the invention herein is particularly suitable, the emergency or "scram" opperation of shutting down the reactor is preferably effected by quickly releasing the adjustable axially vertical control rods which are normally suspended in the core of the reactor by means of cables attached to the upper ends of the control rods. This enables the control rods to be lowered or dropped into the core by the force of gravity without having to depend upon any other power source. In such cases, the upper end of the cable may be conveniently attached to, and wound around, a reel such as a drum, preferably mounted upon a horizontal axis, which drum may be rotated by a suitable motor in order to adjust the vertical position of the control rod from time to time, during normal operation, whenever occasion requires.

The normal adjustment of the control rod up or down is usually made in minute amounts, and the gear ratio between the motor and the drum may be in the neighborhood of 300 to 1. Hence, even at high motor speed the speed of insertion of the rod in the case of an emergency would not lower the control rod quickly enough to insure proper safety and thus prevent a catastrophe. Therefore, in the case of a scram operation it is usual to initiate the scram by disengaging the drum from the motor. This is done by switching off the current from an electromagnetic clutch which demands electric current in order to maintain an operative mechanical connection between the motor and the drum.

When the scram button is pressed down, the gearing which connects the drum to the motor is instantly unclutched. This enables the weight of the control rod to spin the reel freely as the rod descends by gravity into the reactor core.

However, it is found convenient, in some reactors, to have control rods from 8 to 16 feet in length and weighing from 100 to 500 pounds or more. In the case of a scram where the rod can fall about 16 feet, the uncontrolled descent of the control rod must be regulated during the scram in such a manner as not to unduly lengthen the time required to lower the control rod in the core for a sufficient depth to stop the reaction. On the other hand, the falling speed of the rod after it has reached a "safe" position in the core of the reactor should be decelerated or slowed down to a safe level soon enough and in such a manner as to avoid unduly straining or breaking the cable by which the control rod is suspended from the drum. Since it is not practical or safe to equip the control rod itself with a mechanical brake or drag, it seems to be advisable to control the vertical movement of the rod at the cable or drum.

The problem is complicated by the requirement that the time length of the scram period, from the beginning to end, should not exceed a relatively short period, whether the control rod, at the beginning of the scram, happens to be in its highest or its lowest normal working position in the reactor core. Obviously, when it is recognized that the full force of gravity will cause an object to fall a distance of only 16 feet in one second, and when the rod in one type of reactor, for safety reasons, may be required to drop a distance of 6 feet in about a second, there must be a minimum of unnecessary interference with the force of gravity during the initial portion of the drop. On the other hand, whether the acceleration of the rate of fall of the rod be substantially the same throughout the descent of the rod to a safe position, or whether it follows another pattern, the falling speed of the rod should be reduced to zero by the time the rod reaches its lowest position in the core.

During the scram operation, the pull on the cable should not be reduced to less than about 25% of terrestrial gravity, otherwise there is a possibility that the cable may jump its track on the winding drum.

In this connection, reference may be made to the control rod system and apparatus for controlling the fall of the control rod of a nuclear reactor, as set forth in U.S. patent application Serial No. 257,693, filed on February 11, 1963, in the names of Peter Fortescue and Francis R. Bell, two of the joint inventors herein, which said prior application has been assigned to the assignee of this application.

In some types of nuclear reactors, it may not be necessary, in the case of a scram, to lower the control rod for a distance of more than a foot or so below its normal operating position in the reactor before a safe position has been attained. Nevertheless, such safe condition should preferably be reached within the space of a second or so. In such a reactor, the remainder of the fall during which deceleration occurs may be effected in a longer period of time.

Although the type of control rod drive described herein is adaptable for use in the first type of nuclear reactor first above referred to, the embodiment to be herein specifically described is particularly well suited for use in a nuclear reactor of the type in which a safe position may be attained in a comparatively short initial portion of the entire scram fall or stroke of the control rod.

It will be understood that in the case of suspension types of control rods within the range of weight and length mentioned herein, in order to avoid undue stresses on the cable, the decelerating force preferably should not exceed about 10 times the accelerating force during the initial period of the fall, or about 5 times the weight of the control rod. Also, there are requirements imposed by space limitations, and finally the apparatus employed must be safe and operative under all conceivable conditions now known or which may be encountered during the future use of the equipment.

The principal object of the present invention is to provide a safe, fool-proof, durable, economical, efficient and simple apparatus or system of the class herein generally described which will satisfactorily meet the requirements above referred to, and which will not materially interfere with the efficient and economical operation of the nuclear reactor as a whole.

A further object of the invention is to provide a system or apparatus for effecting a scram or emergency shut down of the reactor, without resorting to a power source other than terrestrial gravity.

In the following description there is disclosed an embodiment of said system and apparatus in which a major percentage of the potential energy stored in the control rod at its normal elevated working position in the reactor core, is used to impart motion to a rotating system, including a wheel, in such manner that the normal acceleration of the speed of descent of the rod during an initial part of the total scram period is not unduly reduced until a safe position has been reached. However, during the later portion of the scram period, the proportion of the kinetic energy absorbed or stored in the rotating system as compared with that retained by the rod itself, increases substantially and rapidly, so that the kinetic energy of the rod itself will not be too large to handle with safety when the rod approaches its final bottom position in the reactor. This result is accomplished by automatically increasing the effective inertia of said rotary system during the fall, so that the increase in kinetic energy of the system due to the fall will be largely absorbed in the rotating system without any objectionable increase in the speed of the fall.

In said present embodiment, the cable by which the control rod is suspended in the reactor is preferably wound around a spool or reel of the pancake type mounted to rotate on a horizontal axis, the spool having flanges of relatively large diameter, spaced apart to accommodate overlying radially spaced turns of the suspension cable during the normal operation of the reactor. When the cable is completely unwound, the inner end of the cable remains attached to the spool or reel.

In the drawings accompanying this application:

FIGURE 6 is a diagram showing the relationship between time, velocity and position, of the control rod during the scram period;

FIGURE 7 is a side view, partly in section, of a modification of the wheel unit disclosed in FIGURE 1; and FIGURE 8 is a sectional plan taken on the line 8—8 of FIGURE 7.

Figure 5:
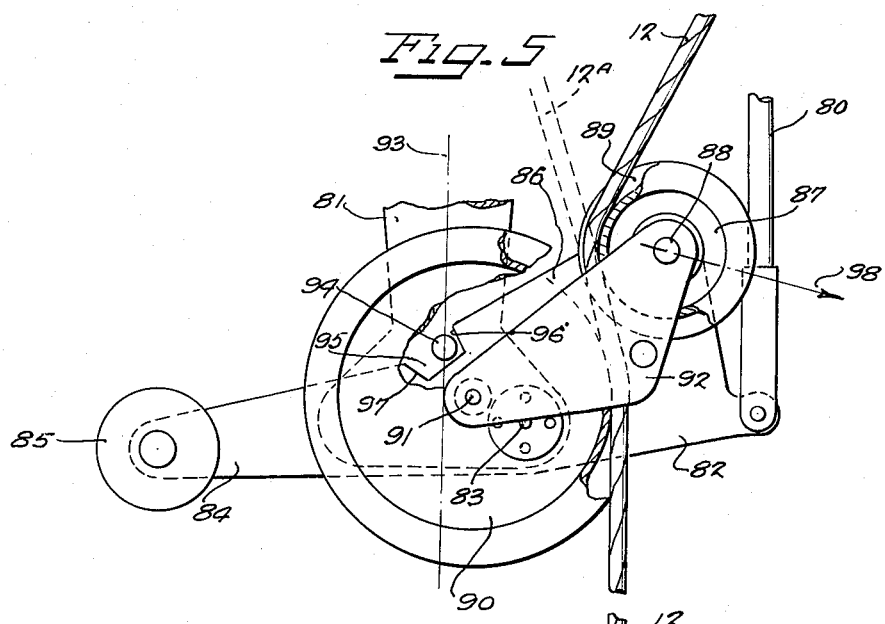
FIGURE 5 is a fragmentary side elevation, partly in section, of a portion of FIGURE 4 showing the parts of an idler arrangement for positioning one of the two cables 12.

In FIGURE 5 of the drawings there is indicated one of the control rods 11 which may be about 16 feet long and weigh as much as 500 pounds. In the present instance the maximum distance of fall or "stroke" is about 16½ feet (see FIGURE 6). Each of the control rods 11 through suitable connections (not shown in detail here) is suspended from the lower end of one of the cables 12 (see FIGURE 2) which is hung from one of the two reels 13. Referring also to FIGURE 3, it will be seen that each of the reels 13 is of the pancake type, that is to say, it has a pair of spaced flanges 14 and 15 which are of relatively large diameter, the distance between said flanges being sufficient to comfortably receive the superposed spiral turns of the cable 12.

Each of the reel or spools 13 comprises a hub portion 16 from which extends an annular flange or web 17, the outer periphery of which is enlarged to form a concentric support for the two flanges 14 and 15 of the reel, which extend a sufficient distance radially outwardly from the hub 16 to accommodate, in this instance, about six spiral turns of the cable 12. The inside spiral turn of the inner end 18 of the cable (see FIGURE 2) is supported by the barrel 19 of the reel, and is welded otherwise secured in a clevis 20.

Said clevis 20 is anchored in a head block 21, having opposed wings or extensions 22 and 23, and which is a loose fit between the flanges 14 and 15 of the reel 13. Said head block 21 is pivotally positioned between said flanges 14 and 15 by means of four bolts 24 which clamp said block 21 to and between a pair of opposed journals in the form of collars, which are rotatable in opposed aligned bearing holes bored in the spool flanges 14 and 15. The said collars have outer annular flanges 25 fitting in circular recesses in the outside faces of the spool flanges 14 and 15.

Figure 2:
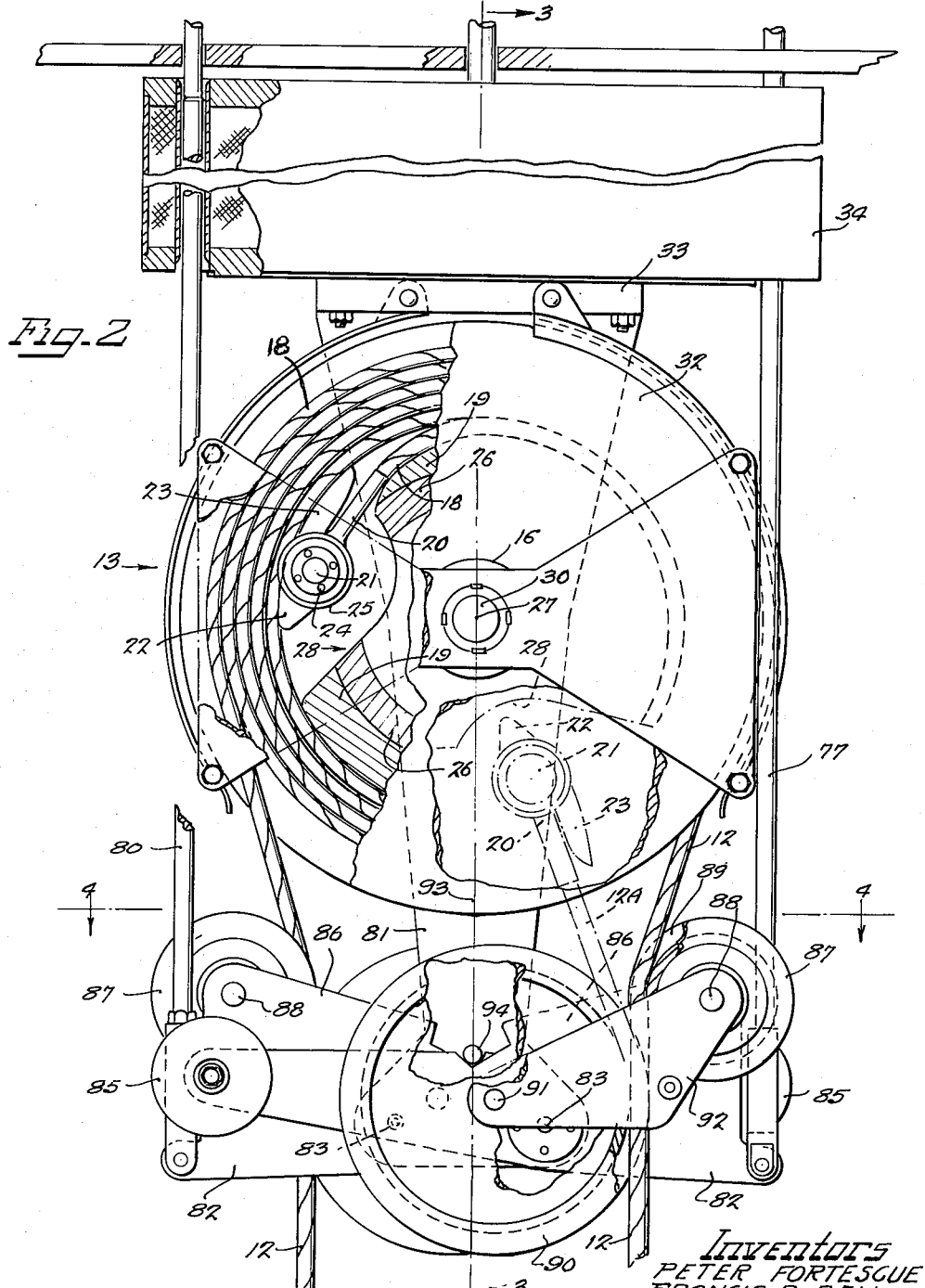
FIGURE 2 is a similar view showing the lower part of the apparatus, which includes a pair of reels to which the cables supporting the two separate control rods are connected.
Figure 3:
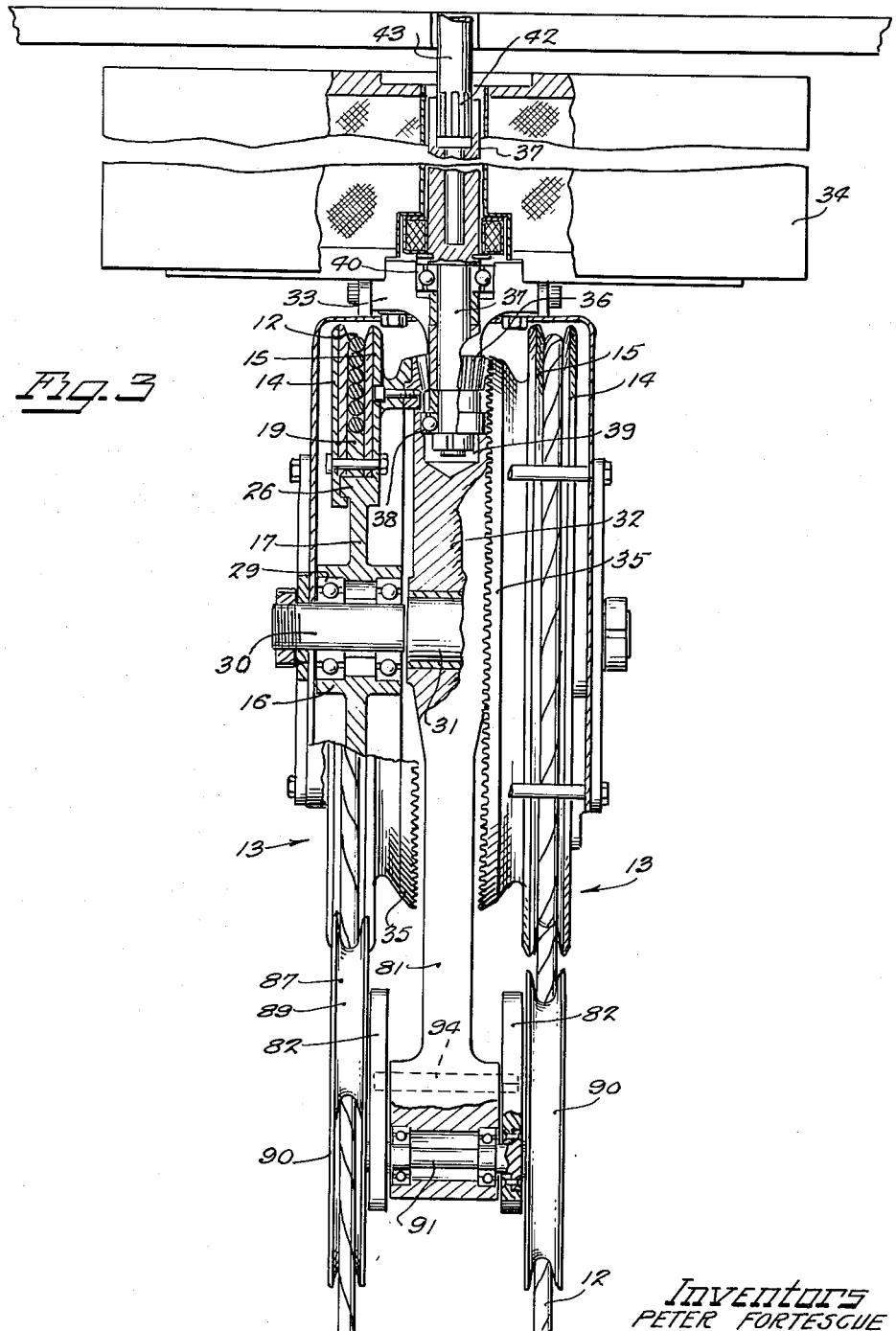
FIGURE 3 is a section taken on the line 3—3 of FIGURE 2.

As shown in FIGURE 2, in normal operating position the upper end of the suspension cable 12 is shown in its innermost position with the cable end resting upon the barrel 19, which extends around the circular rim 26 of the hub member 16 (see also FIGURE 3). Barrel 19 is spiral as to its outer circumference, so that when the cable is wound up on the drum in normal working condition, as shown in FIGURES 2 and 3, the turns of the cable will be in the form of superposed spirals.

Figure 4:
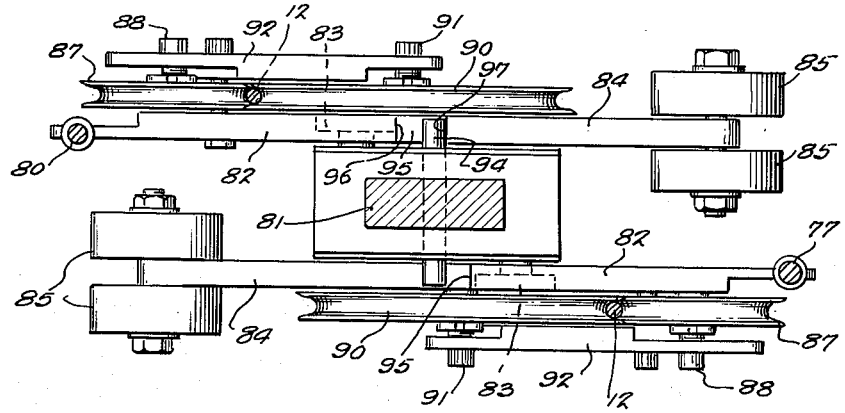
FIGURE 4 is a plan view taken on the line 4—4 of FIGURE 2.

When the cable is completely unwound from the spool at the end of the scram, the clevis 20 and associated parts at the end of the cable occupy the position 12a shown in dotted lines in the lower part of FIGURE 2, with the center of clevis 20 between and in alignment with the reel center 27 and the center line of the cable 12, when in the dotted line or scram position as shown in FIGURES 2 and 4. When the cable is moving between its two positions as shown in FIGURE 2, the head-block 21 and the clevis rotate with the spool. When the clevis is in its upper or normal position, as shown in FIGURE 2, the wings or points 22 and 23 of the head block 21 serve to support the end of the first turn of the cable. In order to enable the clevis 20 to occupy the dotted line position just described, the spiral bed or track 19 and the rim 26 of the spool are cut away as shown at 28 in FIGURE 2, so as to permit rotary movement of the short point 22 of the head block during the final revolution of the reel.

Each of the cable reels is provided with a bearing 29 within hub 16 so that it will rotate freely upon the end of one of the co-axial fixed studs 30 at the ends of the stationary supporting shaft 31 which is integral with and connects said studs 30. Said fixed shaft 31 itself in supported in an axially horizontal bore in a central frame member or bracket 32, the upper end 33 of which is bolted to an upper supporting frame or girder 34.

*The cable windup mechanism*

Referring to FIGURE 3, it will be seen that each of the inner flanges 15 of each of the reels 13 is equipped with a bevel gear 35, both of which gears mesh with an interposed bevel pinion 36 keyed to the lower end of an axially vertical driving shaft 37. The lower end of said shaft 37 is rotatably supported by a bearing 38 which is supported in a recess 39 in the fixed bracket 32. Above the bevel pinion 36 the shaft 37 is also rotatably supported by another bearing 40 in the head of said bracket 32.

Above the bearing 40 (see FIGURE 1) the upper end of the shaft 37 is extended upwardly, as shown at 41, the extended upper end of it being provided with a bore in which are formed internal teeth meshing with a series of teeth or splines 42 on the lower end of the main driving shaft 43. Said shaft 43 extends upwardly towards the motor drive mechanism, which is enclosed in an upper cylindrical extension 44 of the housing 45 in which the flywheel is enclosed.

The upper end of the main drive shaft 43 extends upwardly through and above an over-running clutch 46 which serves to effect a driving connection between the shaft and the flywheel during normal operation of the equipment and also during the scram. The upper end of said main driving shaft 43 is connected to the driven member 47 of an electro-magnetically controlled driving clutch 48, which, at all times, effects a driving connection between said shaft 43 and the electric drive, except when the scram button is depressed, whereupon member 47 and 48 of the motor drive clutch are disconnected so that the main shaft 43 which drives the flywheel and the cable reel can rotate due to the pull of the cables 12. Said motor drive clutch is so arranged that the actuation of the scram button deprives the clutch of energy which is necessary to maintain driving engagement. The control circuitry prevents the re-energizing of the electromagnetic clutch until the main driving shaft 43 and also the flywheel have come to a standstill after the end of the scram period.

The driving member of the electromagnetic clutch 48 is connected to an electric motor 49 through a speed reducing gear box 50 so that the gear ratio between the cable reels 13 and the motor shaft is of the order of 1 to 300. Preferably the driving motor is provided with a brake which, except when released for the purpose of adjusting the height of the control rods, will serve to maintain the control rods at their desired height in the reactor core.

*The variable inertia rotary system*

Figure 1:
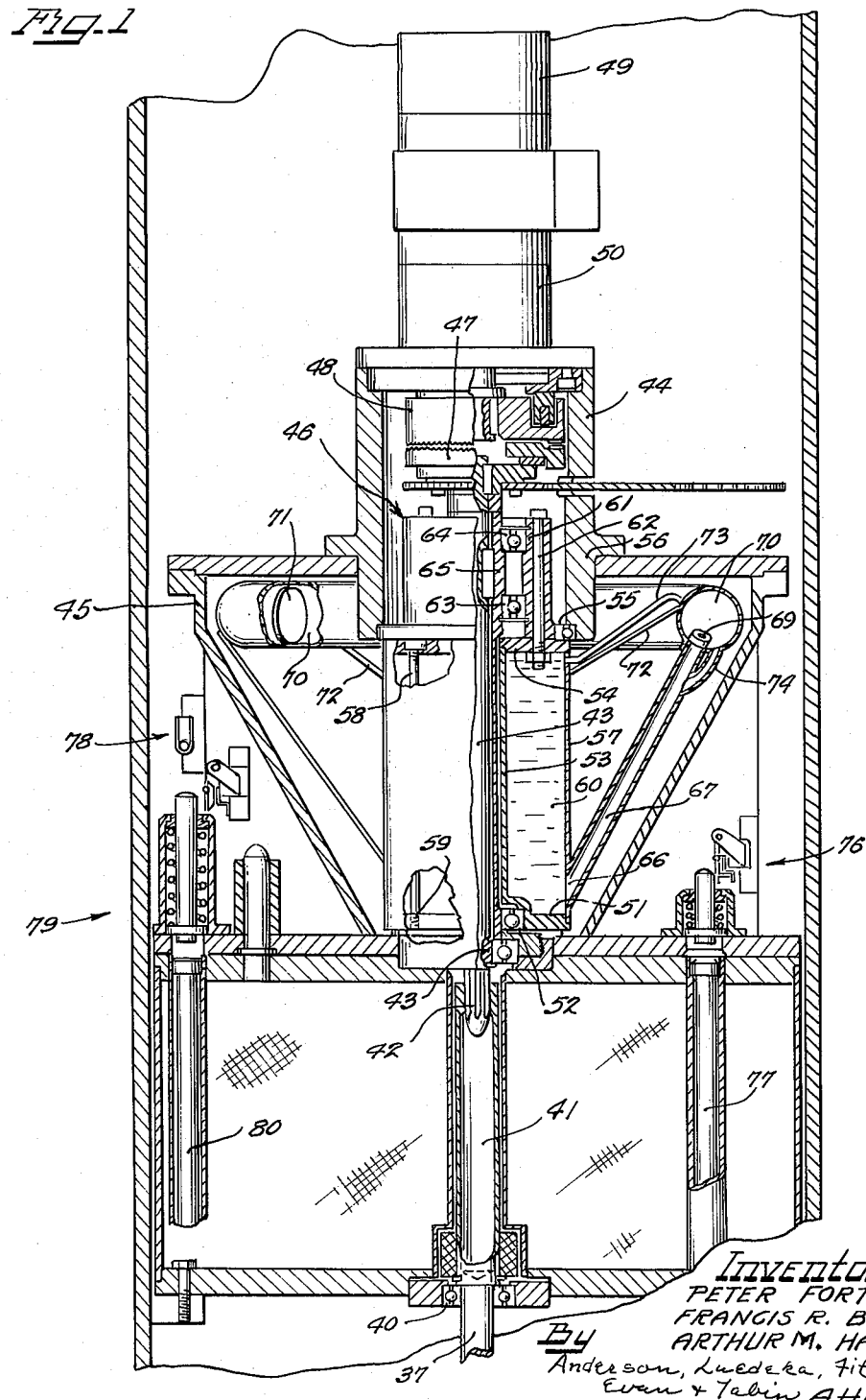
FIGURE 1 is a sectional vertical elevation of the upper part of the apparatus which includes a single variable inertia wheel system serving a pair of spaced duplicate control rods.

Referring now to FIGURE 1 of the drawings, it will be seen that the flywheel previously referred to as enclosed in the casing 45, is co-axial with the axis of the drive shaft 43. The lower end hub 51 of the flywheel is rotatably supported by a ball bearing 52 which surrounds the drive shaft 43. The inside race of the said ball bearing 52 can be connected to the driving shaft 43. The hub 51 has a tubular extension 53 extending upwardly around the shaft 43, and having its upper end supported in an upper end hub 54 which constitutes a support for the ball bearing 55, the outer face of which is carried in the lower end of a circular frame member 56. The outer peripheries of the lower and upper hub plates 51 and 54 of the flywheel are connected by a cylindrical tubular barrel 57 substantially spaced from the outer periphery of the sleeve 53 which connects the inner bores of said hubs 51 and 54 and is spaced slightly from the shaft 43.

The end plates or hubs 51 and 54 and the said concentric barrel elements 53 and 57 are maintained in sealing and tight fitting engagement by means of a series of spaced tie bolts 58 extending between said hub plates 51 and 54, the lower end of said tie bolts being threaded into the lower hub plate 51 as shown at 59. The annular space between the inner barrel 53 of the flywheel and outer barrel 57 of the wheel functions as a font or reservoir which is filled with mercury, or other heavy fluid 60.

Rotary movement is imparted to the flywheel element just described through the over-running clutch 46. An upper extension in the form of an annular member 61 is provided with a series of vertically extending apertures which accommodate bolts 62. The lower ends of the bolts are threaded into the top hub plate 54 and provide support for the inner race of the ball bearing 55. Said upper extension 61 is preferably cylindrical and furnishes a support for the outer races of a pair of similar spaced ball bearings 63 and 64. The inner races of said ball bearings 63 and 64 are mounted on an upper tubular member 65 attached to the driving shaft 43. Said extension 65 derives its power from the gear box 50 of the motor through the electromagnetic clutch 48.

Normally, except in the case of a scram operation, the clutch 46, which is of the over-running type, and the clutch 48, which is the scram-button clutch, are both in driving engagement, so that the pull exerted by the cable 12 tends to turn the motor and thus lower the control rod. However, when the scram button is closed, the clutch 48 is disengaged thus disabling the driving connection between the driving shaft 43 and the gear box 50 of the motor and permitting the pull of the cable to initiate a quick fall of the control rod into the core of the reactor which causes rotation of the flywheel around its vertical axis.

Normally the flywheel and associated parts when in a state of rest, has an initial effective inertia substantially equal to that of the other parts of the moving system, so that the movement of the system will absorb about one half of the acceleration due to the weight of the control rod. It will be understood that the flywheel itself is of light weight and would have a relatively small amount of inertia, if it rotated only at the same r.p.m. as the reels 13. However, both of the large diameter gears 35, mesh with the small bevel pinion 36 (see FIGURE 3) so that the main drive shaft 43 rotates about ten times as fast as the cable reels. Hence, the rotary system can be of comparatively small size and weight in view of the fact that the kinetic energy of a rotating object varies in accordance with the square of the rotational speed, other things being equal.

It will be understood that in the case of the pancake type reels herein described, the effective diameter of the spool will vary in accordance with the number of turns of the cable occupying the reel. In the present instance, the radial distance of the top or outer coil 18 on the spool may be about 60% more than the minimum radial distance between the center of the spool and the periphery of the spiral supporting track 19 which underlies the inside turns of the coils. Hence, the number of revolutions of the spools per foot of fall of the control rod will increase some 60% during the time that is required to fully unwind the cable from the reel. This increase in the effective mechanical inertia of the rotating system during the period of the fall of the rod is of considerable value in reducing the velocity of the fall of the rod so as to reduce the strain on the cable during the later portion of the scram period. However, another important feature involving another way to reduce the cable tension will now be described.

Referring now to FIGURE 1 of the drawings, it will be seen that the outer barrel of casing 57 of the wheel is equipped with a plurality of tubes or conduits 67 extending obliquely upwardly and spaced apart around the casing. The lower ends of these tubes 67 are welded or otherwise secured in the barrel 57 which is perforated, as shown at 66, in order to provide a conduit or channel 67 communicating with the body 60 of mercury or other heavy material which is liquid, at room temperature, carried in the reservoir 57. The upper ends of these tubular members 67 are provided with openings 69 so that when the wheel attains a sufficiently rapid rotary speed after the start of the scram, the centrifugal force will be sufficient to propel the liquid upwardly and outwardly from conduit 67 through the apertures 69 and into the wheel rim which is in the form of a tubular toroidal chamber 70.

In the present instance, said chamber 70 is provided with two or more circumferentially spaced baffles or dams as indicated at 71. In FIGURE 1, these dams 71 are shown imperforate so that the mercury will rotate at substantially the same orbital speed as the periphery of the chamber 70. The upper end of the toroidal pipe or chamber 70 is braced by means of a series of stays 72 and preferably one or more air pipes 73 may be employed to connect the interior of the toroidal pipe 70 with the upper end of the casing 57 so that the gas pressure in the chamber 70 and the upper end of the reservoir will be equalized. Also, in order to permit the mercury to drain from the bottom of the toroidal chamber 70, two or more drain ducts or by-passes 74 may be provided.

Referring now to FIGURE 6 of the drawings, and particularly the velocity curve A, it will be seen that in the present instance, the total length of the scram period until zero height of the scram fall has been reached, is figured at 3 seconds. The initial inertia of the moving system is such that the acceleration caused by gravity acting upon the falling control rod, starts out at about 16 feet per second, per second. During the second part of the scram period the actual falling velocity instead of having a speed of 16 feet per second multiplied by the elapsed time in seconds, is only 7 feet per second, and thereafter the velocity does not increase, but on the contrary, may fall off somewhat during the later part of the stroke, at which time the velocity of the fall may be about 6 feet per second and the control rod has reached a position of about one foot above zero elevation. During this later part of the fall, most of the kinetic energy imparted to the system by the falling rod has been absorbed by the rapidly increasing effective inertia of the wheel system. This is due to the transfer of heavy liquid from the central reservoir to the outer toroidal chamber. This transfer of weight from the font 60 to the rim of the wheel increases the inertia of the rotating system so that the acceleration of the speed of rotation of the wheel has been automatically slowed down to about zero.

During that part of the one quarter revolution or so during which time the actual falling velocity of the control rod must be reduced from about 6 feet per second to zero, the average deceleration during said last length of a second need not be materially greater than fifty feet per second per second, and the maximum deceleration need not exceed about 200 feet per second per second, i.e., about six times $g$, so that the total maximum pull on the cable is not in excess of about 7 times the weight of the rod. It will be understood that before the cable has reached the position represented by the dotted line position in FIGURE 2, the cable no longer tends to turn the reels with the result that the over-running clutch 46 will be released, and the wheel continues to coast freely until the friction of the bearings finally brings it to a standstill. Meanwhile, as the wheel system continues to rotate by itself, the reels can oscillate until the pendulum movement is arrested by friction. This occurs before the wheel has stopped rotating.

*Auxiliary equipment*

In this application, no claim is made to the specific means for monitoring or controlling the adjustment of the control rods. However, it will be understood that the system and equipment herein described is capable of operation with various types of such indicating or monitoring equipment. For example, as shown in FIGURE 1, the control rod full-out indicator switch 76 may be operated by one of the push rods 77 (not shown in FIGURE 5) and the full-in indicator switch 78 and the broken cable indicator switch 79 may be operated by one of the push rods 80, both shown also in FIGURE 5.

Referring now to FIGURE 3, it will be seen that the depending bracket 32 is extended below the shaft 31 to form a leg 81 which furnishes the support for the duplicate sets of cable guiding equipment shown in FIGURES 2 and 4. Referring to FIGURES 2, 4 and 5, it will be seen that said member 81 supports a pair of duplicate rock levers 82 mounted upon opposite sides of the leg 81 and each having a pivot 83 carried by said leg 81. Each set of rocker arms 82 and its associated parts is identical so that only one need be described.

Referring now to FIGURE 5, the rocker arm 82 has a long arm 84 which supports a pair of counter weights 85. The other arm 86 of said rock lever extends upwardly at an oblique angle to form a support for an idler pulley 87 mounted on an axle 88. Said pulley or sheave 87 has an outer groove 89 which accommodates the cable 12. Said cable 12 is also trained around a larger idler sheave 90 which is mounted to rotate upon an axle or pivot 91 which extends between and is carried by, the lever 82 and by the plate 92 which is fastened to the rock lever 82.

It will be noticed that the axis or pivot 91 of the large sheave 90 is off-set to one side of the center line 93 of the bottom leg 81 of the bracket 32. The pivot 83 around which the rock lever 82 can rotate, is also off-set to the right side of the center line 93 and is below a stop pin 94 which lies in the center line 93 and is fixedly supported by leg 81, as shown best in FIGURE 4.

As shown in FIGURE 5, the upper edge of the rock lever 82 is cut away or notched as shown at 95, so that the lever 82 may swing past the stop pin 94 a limited distance in either direction, until said fixed pin 94 is engaged by one of the abutments 96 or 97 which are located at opposite ends of said notch 95.

Under normal conditions, the pull on the cable 12 will overcome the tendency of the counter weights 85 to rock the lever 82 in a counter-clockwise direction around the axis 83. The cable 12 is normally in the position shown in FIGURE 5 so that the resultant pressure upon the pivot 88 which is exerted by the bend in the cable, is in substantially the direction of arrow 98. In view of the fact that the pull on cable 12 is equal to the weight of the control rod, the pull of the cable will tend to rock the lever 82 in a clockwise direction around the pivot 83 which will overcome the contrary effect of the counter weights 85.

Under such normal conditions, the position of the rock lever 82 will be such that the position of the push rod 80 (see also FIGURE 1) will show that the control rod is in normal working condition.

On the other hand, if the cable 12 breaks for any reason, or if the scram button is depressed, the cable will no longer remain in the position shown in full lines in FIGURES 2 and 5. In either such case, the cable can not urge the rock lever 82 to swing clockwise around its center 83. The counter weights 85 will thereupon swing the rock lever in a counter-clockwise direction. This will cause one of the push rods 80 to operate one of the switches 76 or 79 so as to transmit to the instrument panel or the control board the necessary indication or indications of the abnormal position of the control rod.

*Modification*

In FIGURES 7 and 8 there is also shown an arrangement in which mercury 99 is contained in a font or reservoir 100 below the toroidal chamber 101. The result will be that the mercury, under a moderate centrifugal action during the low-velocity beginning of the scram period, will soon start to flow into the pipes 102 and then will spout from the outer ends 103 of the pipes 102 at a ground speed higher than the peripheral ground speed of the wheel. The ends oft he jet pipes 103 are each provided with a nozzle or opening 104 so arranged that the jet of mercury will spout tangentially out of the opening 104 in the direction of rotation of the flywheel. This will result in a reactive force in the direction of the arrow 105 so as to slow down the chamber 101 which is rotating in the opposite direction as shown by arrow 106. In this respect the operation is the reverse of that of the usual lawn sprinkler.

The mercury comes out of the jet nozzle at a ground speed higher than that of the wheel, and will gradually fill the chamber 101, which is not equipped with diaphrams. The slight friction between the mercury and the wall of the chamber will tend to equalize the ground speed of the wheel and the mercury so that in time the mercury and wheel will rotate almost at the same speed as parts of a unitary rotating system.

Since the friction due to the movement of mercury relative to the wheel is relatively small, nearly all of the energy put into the wheel by the fall of the control rod, prior to the terminal phase of the scram period, is represented by the kinetic energy absorbed by the rotary system which in effect includes not only the chamber 101, but also the added mercury which rotates in the same direction as the chamber but at a higher ground speed. Hence, it will be seen that this jet arrangement is capable of increasing the effective inertia of the rotary system during the scram period to a somewhat higher value than the diaphram arrangement shown in FIGURE 1, and consequently provides a somewhat better result as indicated by the velocity curve B in FIGURE 6.

The particular example herein described has a toroidal chamber 101 which will accept about 50 pounds of mercury. The nozzles or orifices 104 have a total area of about 0.03 square inch, which, during the scram period, will deliver about 40 pounds of mercury into the chamber.

A patent is solicited for any and all herein disclosed patentable subject matter invented by applicants.

The embodiment disclosed herein may be changed or modified without departing from the scope of the invention.

Various features now believed to be new and patentable are set forth in the appended claims.

What is claimed is:

1. For use in a nuclear reactor having a veritcally movable control rod, a cable for suspending said rod, a flywheel normally geared to said cable, a motor, means connecting the motor to said cable for adjusting the height of the rod, including a clutch, and means for promptly disengaging the clutch in case of an emergency which requires a quick fall of the control rod, the method of controlling said fall of the control rod to prevent the rod from arriving at a desired lower position at excessive speed while not unduly slowing down the initial fall of the rod, which method comprises,
    (a) disengaging said clutch and then using a percentage of the potential energy of the falling rod to effect rotary movement of the flywheel
    (b) increasing said percentage automatically during the fall of the rod by automatically increasing the effective inertia of said wheel itself during the fall, and
    (c) disconnecting said gearing at about the time when the rod reaches its bottom position in the reactor so as to permit said wheel to coast free from said rod and thereby remove from the rod system the kinetic energy absorbed by the flywheel.

2. For use in a nuclear reactor having a vertically movable control rod, a reel, a cable for suspending said rod from said reel, a flywheel normally geared to said cable, a motor, means connecting the motor to said cable for adjusting the height of the rod, including a clutch, and means for promptly disengaging the clutch in case of an emergency which requires a quick fall of the control rod, the method of controlling said fall of the control rod to prevent the rod from arriving at a desired lower position at excessive speed while not unduly slowing down the initial fall of the rod, which method comprises,
    (a) disengaging said clutch and then using a percentage of the energy developed in said fall to effect rotary movement of the wheel connected to said reel,
    (b) increasing said percentage automatically during the fall of the rod to its desired position by causing a part of the mass of the rotating system to move outwardly of the system axis by centrifugal force as an incident to an increase in the peripheral speed of the flywheel so as to increase the normal effective inertia of the wheel system during the fall of the rod, whereby the said effective increase in the inertia of the system exerts a progressively increasing braking effect upon the moving system and thereby tends to reduce the rotating speed of the reel and the linear downward speed of the rod, and
    (c) permitting said wheel system to coast free from said rod after the rod reaches its said desired position.

3. For use in a nuclear reactor having a vertically movable control rod, a reel, a cable for suspending said rod from said reel, a motor, means connecting the motor to said cable for adjusting the height of the rod, means for controlling the fall of the control rod in an emergency to prevent the rod from arriving at a desired lower position at excessive speed while not unduly slowing down the initial fall of the rod, which means comprises,
    (a) a reel for said cable for adjusting said rod during normal operation of the reactor,
    (b) a rotatable system including a wheel,
    (c) a free wheeling clutch for drivingly connecting the reel to said wheel during the descent of the rod, but permitting continued rotation of said wheel, free from the reel, after said rod reaches its bottom position in the reactor,
    (d) the arrangement including means for automatically increasing the effective inertia of the wheel during said fall so that a greater percentage of the kinetic energy developed in the system by the descent of the rod wil be absorbed by the wheel during the lower portion of the descent of the rod than was absorbed by the wheel during the upper portion of the descent of the rod and clutch means for disconnecting the motor at the start of the fall.

4. The subject matter of claim 3, in which the wheel has an outer normally empty annular chamber and liquid guiding means leading outwardly into said chamber and carries an inner font of liquid so that when the wheel is rotated by an emergency fall of the rod, the centrifugal force generated by said rotation will cause the liquid to flow from said font outwardly into said chamber.

5. The subject matter of claim 3, in which the wheel has an outer normally empty annular chamber and liquid guiding means leading outwardly into said chamber and carries an inner font of a heavy liquid, so that when the wheel is rotated by an emergency fall of the rod, the centrifugal force generated by said rotation will cause the liquid to flow from said font outwardly into said chamber, whereby an increasing percentage of the kinetic energy developed by the fall of the rod wil be absorbed by the wheel.

6. The subject matter of claim 3, in which the wheel has an outer normally empty annular chamber and liquid guiding means leading outwardly into said chamber and carries an inner font of a heavy liquid, so that when the wheel is rotated by an emergency fall of the rod, the centrifugal force generated by said rotation will cause the liquid to flow from said font outwardly into said chamber and then tangentialy in the direction of the rotation of the wheel whereby the reactive force developed by said tangential flow will tend to slow down the wheel.

7. For use in a nuclear reactor having a vertically movable control rod, a cable for suspending said rod, a flywheel normally geared to said cable, a motor, means connecting the motor to said cable for adjusting the height of the rod, including a clutch, and means for promptly disengaging the clutch in case of an emergency which requires a quick fall of the control rod, the method of controlling said fall of the control rod to prevent the rod from arriving at a desired lower position at excessive speed while not unduly slowing down the fall of the rod, which method comprises,
    (a) disengaging said clutch and then using a percentage of the potential energy of the falling rod to effect rotary movement of the flywheel,
    (b) increasing said percentage automatically during the fall of the rod by permitting a body of liquid normally contained in a font carried by the wheel in a central location, to flow by its own centrifugal force from said font outwardly and then through the orifice so as to form a jet stream pointed tangentially in the direction of rotation of the wheel, and then collecting said liquid in a receptacle carried by the wheel, so as to increase the effective inertia of the flywheel during the fall, and
    (c) permitting said wheel to coast after the rod reaches its said desired position.

8. For use in a nuclear reactor having a reactive core, the combinaiton of, an axially vertical rod insertable in said core for controlling the reaction, a cable for suspending said rod, an axially horizontal reel on which said cable is wound so that the weight of the suspended rod will tend to rotate said reel, an axially vertical shaft, bevel gearing connecting said reel and shaft, a motor, a driving connection between said motor and said shaft, which said driving connection includes a clutch which may be disengaged at will when it is desired to effect a quick fall of the rod in an emergency, an axially vertical flywheel, means for driving said flywheel from said shaft, said shaft and flywheel being coaxial and being positioned above the reel, and an over-running clutch for automatically disengaging said flywheel drive-means when the faling rod reaches a desired bottom position.

References Cited by the Examiner

UNITED STATES PATENTS 3,085,962  4/1963  Whittaker  176—36

FOREIGN PATENTS 682,769  11/1952  Great Britain.
859,811  1/1961  Great Britain.

CARL D. QUARFORTH, *Primary Examiner.*

REUBEN EPSTEIN, *Examiner.*